FIG. 1 — Raw Materials

| | Zinc Oxide | Sodium Bentonite | Nepheline Syenite | Talc Int. Talc Co. | Flint | Wollastonite | Olivine | Bauxite | Ball Clay |
|---|---|---|---|---|---|---|---|---|---|
| ZnO | 99.6 | — | — | — | | | | | |
| $SiO_2$ | | 64.0 | 60.4 | 58.3 | >99.9 | 51.76 | 2MgO(FEO)·$SiO_2$ | | |
| $Al_2O_3$ | | 21.0 | 23.6 | .85 | — | — | varies | $Al_2O_3 \cdot 3H_2O$ usually | Mainly $Al_2O_3 \cdot 2SiO_2 \cdot 2H_2O$ with impurities |
| $Fe_2O_3$ + FeO | .08 | 3.5 | — | .3 | — | .46 | Rock must be ground | with kaolin and impurities | hydrated iron oxide |
| MgO | | 2.3 | .1 | 28.8 | — | — | | | of iron, titanium, |
| CaO | | .5 | .7 | 5.9 | — | 47.56 | — | Lumps must be ground | minor impurities |
| $Na_2O$ $K_2O$ | | 3.0 | 14.4 | — | — | — | | | of lime magnesium |
| Ignition | | 5.2 | .7 | 4.3 | — | .09 | | | calcium & |
| Minor | .32 | .3 | .1 | 1.55 | — | .13 | | | alkali metals. |
| Particle Size | 1.2μ max. | <0.5μ | >325 mesh | >325 mesh | >325 mesh | >325 | >325 | >325 | 0.5μ |

INVENTORS
HERBERT H. GREGER
DEAN F. GREGER
BY John Gibson Semmes

FIG. 2 — Ceramic Tile Compositions (Parts by Weight)

| BODY | (a) | (b) | (c) | (d) | (e) | (f) | (g) | (h) | (i) | (j) | (k) | (l) | (m) | (n) | (o) | (p) |
|---|---|---|---|---|---|---|---|---|---|---|---|---|---|---|---|---|
| ZINC OXIDE | 95 | 90 | 80 | 70 | 80 | 70 | 65 | 65 | 50 | 94 | 80 | 50 | 80 | 80 | 90 | 85 |
| BENTONITE | 5 | 10 | 10 | — | 5 | 5 | 5 | 5 | 5 | — | 5 | 5 | 5 | 5 | 5 | 5 |
| BALL CLAY | — | — | — | — | 5 | 5 | 5 | 5 | 5 | — | 5 | 5 | — | 5 | — | 10 |
| NEPH. SYANITE or FELDSPAR | — | — | 5 | 20 | — | — | — | — | — | 5 | — | — | — | — | 5 | — |
| FLINT | — | — | 5 | 10 | — | — | — | — | — | — | — | — | — | — | — | — |
| TALC | — | — | — | — | 10 | 20 | 25 | — | — | — | — | — | — | — | — | — |
| WOLLASTONITE | — | — | — | — | — | — | — | 30 | 40 | — | 10 | — | 10 | 10 | — | — |
| OLIVINE | — | — | — | — | — | — | — | — | — | — | — | 40 | — | — | — | — |
| Fe₂O₃ | .035 | .07 | .40 | .1 | .045 | .045 | .045 | .5 | — | — | .045 | .4 | .045 | .045 | .045 | .05 |
| C₂O₃ | .20 | .20 | .20 | .2 | .1 | .1 | — | .2 | — | — | — | .2 | — | — | — | .2 |
| A₂O₃ or BAUXITE | — | — | — | — | — | — | — | — | — | 1 | Cu0.5% | — | MnO₂:2 | C₂O₃:2 | C₂O₃:2 Cu₂O₃:.33 | — |
| COLOR | GREEN | GREEN | BLUE-GREEN | LIGHT BLUE | LIGHT GREEN | GREEN | LIGHT BUFF | FULL BODIED GREEN | FULL BODIED GREEN | LIGHT BUFF | GRAY | GREEN | AQUA | BUFF | BLUE GREEN | GREEN |
| RESISTANCE PER .25 x 14 x 14 INCHES | 12,000Ω | 25,000Ω | 140,000Ω | 110,000Ω | 65,000Ω | 35,000Ω | 100,000Ω | 25,000Ω | 80,000Ω | 70,000Ω | 65,000Ω | 400,000Ω | 70,000Ω | 70,000Ω | 45,000Ω | 25,000Ω |
| SHRINKAGE % | 15.4 | 17.8 | 12 | WARPED | 16.5 | 13.5 | 13.0 | SLUMPED AT 1250°C 12.6 | SLUMPED AT 1250°C 12.6 | NOT DENSE | 16.5 | 12 | 16.5 | 16.5 | 16.0 | 16.5 |

# 3,121,065
ELECTRICALLY CONDUCTIVE CERAMIC TILE
Herbert Hans Greger, 9901 Glen Road, and Dean Felix Greger, 1714 Farragut Ave., both of Rockville, Md.
Filed Aug. 3, 1960, Ser. No. 47,231
23 Claims. (Cl. 252—519)

This invention is related to electrically conductive floor covering of hard, incombustible, ceramic material for protection against fire hazard where explosive gas air mixtures may develop, and also against protection of personnel against electric shock where short circuits may develop from handling of electrical equipment. More specifically this invention is related to conductive tile in a variety of colors other than black or dark brown.

A number of years ago the ceramic industry was approached to develop conductive tile for operating room suites in hospitals and the results of these efforts were tile products of suitable conductivity in black and in dark brown. The black is based on carbon or magnetite ($Fe_3O_4$) the brown on ferric oxide ($Fe_2O_3$) and magnetite ($Fe_3O_4$). These dark colors have been accepted with reluctance because they seemed to be the only colors associated with conductive materials for a ceramic type of tile. U.S. Patent 2,851,639 entitled "Electrically Conductive Ceramic Floor-Tile Units and Floors Composed of Them," 1958, Ford et al., assignors to The Mosaic Tile Co. describe such a conventionally dark-colored composition as containing: 31 $Fe_3O_4$, 23.3 stoneware clay, 23.3 ball clay and 22.4 Keystone spar.

According to the present invention a tile is developed which has the appropriate conductivity and can be produced in a variety of light colors, tints and shades which are very pleasing and can be matched with the color schemes not only of operating room suites, but can be used in corridors or patients rooms as well.

Conductive tiles in this variety of colors can be assembled in suitable designs to provide not only safety but also a desirable cheerful appearance in a hospital. The use of such colored tile is naturally not limited to hospital use for the tile may also be used in manufacturing areas where explosion hazards exist due to sparking or where danger from high voltages exist.

These tile colors are shades and tints of yellow, leaf (light green), green, jade, turquoise (blue-green). These color designations have been taken from "The American Colorist," by Faber Birren-Prang Company, Publishers. This publication is used here for an approximate definition of the colors that have been developed in the present composition.

Accordingly, it is an object of invention to provide a ceramic tile which is electrically semi-conductive within prescribed limits and which has pleasing light color.

Another object of invention is to provide an electrically conductive ceramic tile which has zinc oxide as a principal component.

Another object of invention is to provide pleasing pastel colors in an electrically conductive ceramic tile.

Yet another object of invention is to provide an electrically conductive ceramic tile composition wherein zinc oxide and heavy, metal oxide staining agents are combined.

Yet additional objects of invention will become apparent from the ensuing specification and attached drawings wherein:

FIG. 1 is a chart illustrating the standard compositions of raw materials used in manufacture of the present ceramic, tile and FIG. 2 is a chart illustrating suggested tile compositions, together with their individual color, resistance and shrinkage characteristics.

The essential constituent of the new tile composition is zinc oxide. Zinc oxide was considered a good insulator until in the mid-nineteen thirties it was shown by a German publication that good semi-conductivity can be developed in zinc oxide although the appropriate conditions had not been precisely shown, nor had the scientific reasons for this conductivity been explained. More recently it has become known that the conductivity mechanism in pure zinc oxide is due to a defect structure with interstitial zinc ions. Other conductivity mechanisms in semi-conductors exist and without intending to be limited by any scientific explanation of the particular conductivity mechanism in the composition of the present tile, it is probably proper to assume that the combination of materials and processing conditions develop a reproducible and rather stable semi-conductivity.

Zinc oxide occurs as the mineral zincite in a hexagonal crystal structure and has a density of 5.6. It has a melting point in excess of 1800° C. and sublimes rapidly at about 1800° C. It is white in color when pure and it is this white color that permits it to be stained by other metal oxides to give pastel colors. Pure zinc oxide could be processed into a tile using kiln firing temperatures close to its melting point. Obviously this would be impractical; rather a temperature near cone 10 or about 1250° C. is desirable.

In order to accomplish this kiln firing temperature a judicious addition of other materials is necessary not only to lower the maturing temperature, but also to adjust semi-conductivity and develop the desired color. Such materials include Wyoming bentonite, ball clay, talc, olivine, and wollastonite. Zinc oxide, being relatively expensive for economic reasons should be reduced to a minimum in the tile, and to accomplish this purpose ZnO is partly replaced by talc and wollastonite. The addition of bentonite to zinc oxide produces an excellent semi-conductive tile which may be fired at such conventional rates as 100° C. per hour or at 1250° C. per hour without harm to the tile. The bentonite greatly improves pressing quality and green strength. The ball clay has similar effects but is somewhat coarser grained. Talc, olivine, and wollastonite are sources of crystalline tile constituents which are preferred as diluents over glasses, because they do not tend to cause warpage and do not envelop the zinc oxide particles with films of non-conductive glass.

The partial replacement of zinc oxide by potter's flint (silica), has been tried but the refractoriness of the tile body is thus increased and its conductivity considerably reduced, even with relatively small additions of flint, probably because of the formation of zinc silicate. A composition of potter's flint-zinc oxide requires high firing temperatures and is, therefore, less desirable, than a composition containing some of the other materials mentioned. However, flint helps to reduce shrinkage. For example, 15 percent flint reduces the shrinkage of the tile composition from about 20 percent to about 13 percent.

These raw materials are dry or wet mixed, pressed into tile and air-fired in the kiln at th rate of 100 to 1000° C. per hour. Preferred maturing temperatures of conductive zinc oxide tile vary from about 1200 to 1250° C. In some cases, higher temperatures may be used without harm to the tile athough the shade of the color may change. The firing range in several of these compositions is unusually wide.

For economy in production the firing cycle should be short. Cycles that bring the tile to top temperature of about 1250° C. within 1 hour have produced good conductivity. Firing cycles of 1 to 10 hours to 1250° C. have also shown good results with ZnO-talc and ZnO-wollastonite compositions.

These fast firing conditions require special equipment, such as the rotating kiln with sand bed described in applicants' Pat. No. 2,973,568 for Apparatus for Fast Firing Ceramic Ware.

The present invention resides in a composition of matter for a ceramic conductive tile in a variety of light colors, the composition consisting of zinc oxide with an addition of other suitable constituents for obtaining density and conductivity, and an addition of heavy metal oxide stains for obtaining light color.

Recently, zinc oxide has been used as a shrinking agent and as an agent to enhance the electrical conductivity of a ceramic body. However, it is submitted that the combination of zinc oxide with a heavy metal oxide stain to produce a variety of light colored, electrically conductive tile composition is unique.

The resistivity of a tile body may be expressed either in ohms per cm. or in ohms in accordance with the code established by the National Fire Prevention Association, Publication #56 entitled "Recommended Safe Practice for Hospital Operating Rooms," 6–2 Conductive Flooring:

"The resistance of the conductive floor shall be less than 1,000,000 ohms and more than 25,000 ohms when measured with an ohmmeter with a nominal open circuit output voltage of 500 volts D.C., using specially designed electrodes for the purpose."

The size of the test samples for purposes of the present invention is about .25 x 1.4 x 1.4 inches and resistivity was measured by means of the "Megger insulation tester," manufactured by the James G. Biddle Company of Philadelphia, Pennsylvania. This test includes the resistance caused by the surface condition of the tile as manufactured and gives a measure of the behaviour of the tile in the floor. Test results are presented here for this reason. There is not necessarily a correlation of these results with those obtained through testing methods where silvered parallel faces are used for determination of resistance.

Firing in air has the tendency to eliminate, by oxidation, the interstitial Zn ions on which the conductivity depends. Therefore, it might be expected that a gas-fired kiln because of reduced oxygen pressure in the kiln atmosphere would produce an improved semiconductivity by increasing the number of interstitial zinc ions as a result of a reduced tendency to oxidize interstitial oxide ions. However, such improvement has not been observed and the semiconductivity of both electric or air-fired and of gas-fired tile turned out to be essentially similar.

So far in all cases of gas-fired tile (in a tunnel kiln with a conventional 36 hr. cycle) warpage through cupping occurred and the colors were bleached especially at the edges of the tile. Tile with these defects is commercially unacceptable. Electric or air-firing produces the desired semi-conductivity, the tile remains straight, has full and uniform color and is a commercially useable product. The atmosphere in an electric kiln is air and all semiconductive tile according to the present invention is "air-fired." Air being the most available gas of uniform composition contributes to the good reproducibility of electrical conductivity in the tile.

Requirements of an electrically, semi-conductive ceramic floor tile composition include:

(1) A body that can be formed by pressing.
(2) A body that will mature at about cone 10 and become fully dense.
(3) A body that can be light-colored in color hues of buff, green, blue and gray.
(4) A body that has semi-conductivity in the range of approximately $1 \times 10^2$ to $1 \times 10^6$ ohms per cm.

All of these requirements exist simultaneously. Also, the body should be capable of fast-firing between 100° C. and about 1000° C. per hour and maturing between cone 6 to cone 12.

ZnO is in some instances a good electrical insulator; in other instances a good semi-conductor. The processing conditions and compositions described below yield a body of good semi-conductivity.

The non-conductive constituents of the tile may be formed variously from the raw materials: Bentonite, ball clay, nepheline syanite, feldspar, flint, talc, wollastonite, olivine or fosterite—all of which contain in varying degrees $SiO_2$, $CaO$, $MgO$, $Na_2O$, $K_2O$, and $Al_2O_3$. FIG. 1 illustrates the composition of these raw materials.

It is believed that the non-conductive constituents of these raw materials may react in the presence of a large excess of ZnO as follows:

$SiO_2$: Will form zinc silicate, a non-conductor which will take zinc oxide away from the conduction mechanism and is, therefore, undesirable.

$CaO$: Will tend to react with $SiO_2$ to form $CaSiO_3$ and liberate a corresponding amount of ZnO or if $CaSiO_3$ (wollastonite) is introduced into the tile body, the calcium silicate remains essentially unaltered by ZnO.

$MgO$: The effects are similar for $MgO$, talc, and olivine as for CaO and wollastonite.

$Na_2O$ and $K_2O$: Will tend to form glass which is of interest for reducing the maturing of the tile to lower temperature. Their quantities must be judiciously controlled, thus limiting the amount of nepheline syanite or feldspar to minor quantities, about 5%, as a tile constituent. Warpage and keystoning occur with larger quantities.

$Al_2O_3$: is present, of course, in tile raw materials as a constituent of bentonite, ball clay, nepheline syanite, feldspar, bauxite or $Al_2O_3$.

Thermochemical reaction with a large excess of zinc oxide will tend to split these compounds and form zinc silicate, glass and alumina. Alumina can react with zinc oxide and enter the zinc oxide crystal lattice. The trivalent alumina ion increases the number of free electrons for the conductivity mechanism of zinc oxide tile and reduces the interstitial zinc ions. (Fortschritte der Mineralogic, vol. 33, p. 97, 1954.) The good stability of the alumina ion appears to be the reason why this tile can be fired in air and develop good stable conductivity.

It has been found that colors in a dense zinc body are uniquely intense even with only small quantities of staining oxides present. Staining oxides may be used in percentages up to approximately 2–3%, although in many cases 0.05 to 0.5 may be sufficient.

Ferric iron oxide produces tints and shades of yellow commonly known as ivory, buff and brown.

Cobalt oxide produces a blue in the absence of iron, while in the presence of iron a variety of tints and shades of attractive greens can be produced, which are known as leaf green, jade and turquois.

Nickel oxide produces a yellow green color.

Copper oxide produces attractive grays.

Manganese and chromium oxide produce aqua and buff respectively.

Conventionally, in a siliceous medium such staining oxides combine with iron oxide to form highly stable dark-colored tile compositions. However, it has been found that in the presence of zinc oxide the staining oxides and iron oxide apparently work separately to produce light colored tile compositions. For example, in a zinc oxide composition, according to the present invention, the iron oxide works initially separately to produce its yellow and the cobalt oxide works separately to produce its blue. These combine to produce a light colored green—instead of the expected black color achieved combinatively from iron and cobalt oxides in conventional tile compositions.

It is submitted that the present invention resides in the combining of heavy metal oxides as staining agents with a zinc oxide medium to produce a light-colored electrically conductive tile composition. Manifestly, the suggested combination, as well as the percentages of constituents, shown in the drawing may be varied without departing from the spirit and scope of invention, as defined in the sub-joined claims.

We claim:

1. An electrically semi-conductive ceramic tile air-fired and matured until dense in the range cone 6 to cone 12, consisting of the following pressed raw materials: 70–90% zinc oxide, and 10–30% non-conductive constituents of the group consisting of sodium bentonite, nepheline syanite, talc, flint, wollastonite, olivine, bauxite and ball clay.

2. An electrically semi-conductive ceramic tile as in claim 1, said pressed raw materials including staining oxides from a trace to 3% by weight from the group of heavy metal oxides consisting of manganese oxide (MnO), chromium oxide ($Cr_2O_3$), cobalt oxide (CoO), nickel oxide (NiO) and copper oxide (CuO), ferric oxide ($Fe_2O_3$).

3. An electrically semi-conductive ceramic tile air-fired and matured until dense in the range cone 6 to cone 12 and consisting of the following pressed raw materials: 95% zinc oxide and approximately 5% bentonite 4. An electrically semi-conductive ceramic tile air-fired and matured until dense in the range cone 6 to cone 12 and consisting of the following pressed raw materials: 95% zinc oxide, approximately 5% bentonite and .10%–.50% cobalt oxide ($Co_2O_3$).

5. An electrically semi-conductive ceramic tile air-fired and matured until dense in the range cone 6 to cone 12 and consisting of the following pressed raw materials: 90% zinc oxide and 10% bentonite.

6. An electrically semi-conductive ceramic floor tile air-fired and matured until dense in the range cone 6 to cone 12 and consisting of the following pressed raw materials: 90% zinc oxide, approximately 5% bentonite and approximately 5% nepheline syanite.

7. An electrically semi-conductive ceramic tile as in claim 6, said pressed raw materials including approximately .25% cobalt oxide ($Co_2O_3$) as a staining element.

8. An electrically semi-conductive ceramic tile air-fired and matured until dense in the range cone 6 to cone 12 and consisting of the following pressed raw materials: approximately 80% zinc oxide, 10% bentonite, 5% feldspar and 5% flint.

9. An electrically semi-conductive ceramic tile air-fired and matured until dense in the range cone 6 to cone 12 and consisting of the following pressed raw materials: 50–95% zinc oxide, and 1–55% of an alumina-containing compound selected from the group consisting of bentonite, ball clay, feldspar, nepheline syanite and bauxite.

10. An electrically semi-conductive ceramic tile air-fired and matured until dense in the range cone 6 to cone 12 and consisting of the following pressed raw materials: approximately 70% zinc oxide, 20% feldspar and 10% flint.

11. An electrically semi-conductive ceramic tile air-fired and matured until dense in the range cone 6 to cone 12 and consisting of the following pressed raw materials: approximately 80% zinc oxide, 5% bentonite, 5% ball clay and 10% talc.

12. An electrically semi-conductive ceramic tile air-fired and matured until dense in the range cone 6 to cone 12 consisting of the following pressed raw materials: approximately 70% zinc oxide, 5% bentonite, 5% ball clay and 20% talc.

13. An electrically semi-conductive ceramic tile air-fired and matured until dense in the range cone 6 to cone 12 and consisting of the following pressed raw materials: approximately 65% zinc oxide, 5% bentonite, 5% ball clay and 25% talc.

14. An electrically semi-conductive ceramic tile air-fired and matured until dense in the range cone 6 to cone 12 and consisting of the following pressed raw materials: approximately 65% zinc oxide, 5% ball clay and 30% wollastonite.

15. An electrically semi-conductive ceramic tile air-fired and matured until dense in the range cone 6 to cone 12 and consisting of the following pressed raw materials: approximately 50% zinc oxide, 5% bentonite, 5% ball clay and 40% wollastonite.

16. An electrically semi-conductive ceramic tile air-fired and matured until dense in the range cone 6 to cone 12 and consisting of the following pressed raw materials: approximately 94% zinc oxide, 5% nepheline syanite and 1% bauxite.

17. An electrically semi-conductive ceramic tile air-fired and matured until dense in the range cone 6 to cone 12 and consisting of the following pressed raw materials: approximately 80% zinc oxide, 5% bentonite, 5% ball clay and 10% flint stained by copper oxide.

18. An electrically semi-conductive ceramic tile air-fired and matured until dense in the range cone 6 to cone 12 and consisting of the following pressed raw materials: approximately 50% zinc oxide, 5% bentonite, 5% ball clay and 40% wollastonite.

19. An electrically semi-conductive ceramic tile as in claim 11, said pressed raw materials including 3% or less manganese oxide as a staining agent.

20. An electrically semi-conductive ceramic tile as in claim 11 said pressed raw materials including 3% or less chromium oxide as a staining agent.

21. An electrically semi-conductive ceramic tile as in claim 11, said pressed raw materials including 3% or less cobaltic oxide as a staining agent.

22. An electrically semi-conductive ceramic tile air-fired and matured until dense in the range cone 6 to 12 and consisting of the following pressed raw materials approximately 85% zinc oxide, 5% bentonite and 10% ball clay.

23. An electrically semi-conductive ceramic tile air-fired and matured until dense in the range cone 6 to cone 12 and consisting of the following pressed raw materials: 70–95% zinc oxide and 5–30% non-conductive constituents of the group consisting of sodium bentonite, nepheline syanite, talc, flint, wollastonite, olivine, bauxite and ball clay.

References Cited in the file of this patent
UNITED STATES PATENTS

| | | |
|---|---|---|
| 896,240 | Phillips | Aug. 18, 1908 |
| 2,490,825 | Mochel | Dec. 13, 1949 |
| 2,616,859 | Verwey | Nov. 4, 1952 |
| 2,851,639 | Ford et al. | Sept. 9, 1958 |